BLOOD, HATHAWAY & BEACH.
Wheel Cultivator.
No. 79,304.
Patented June 30, 1868.
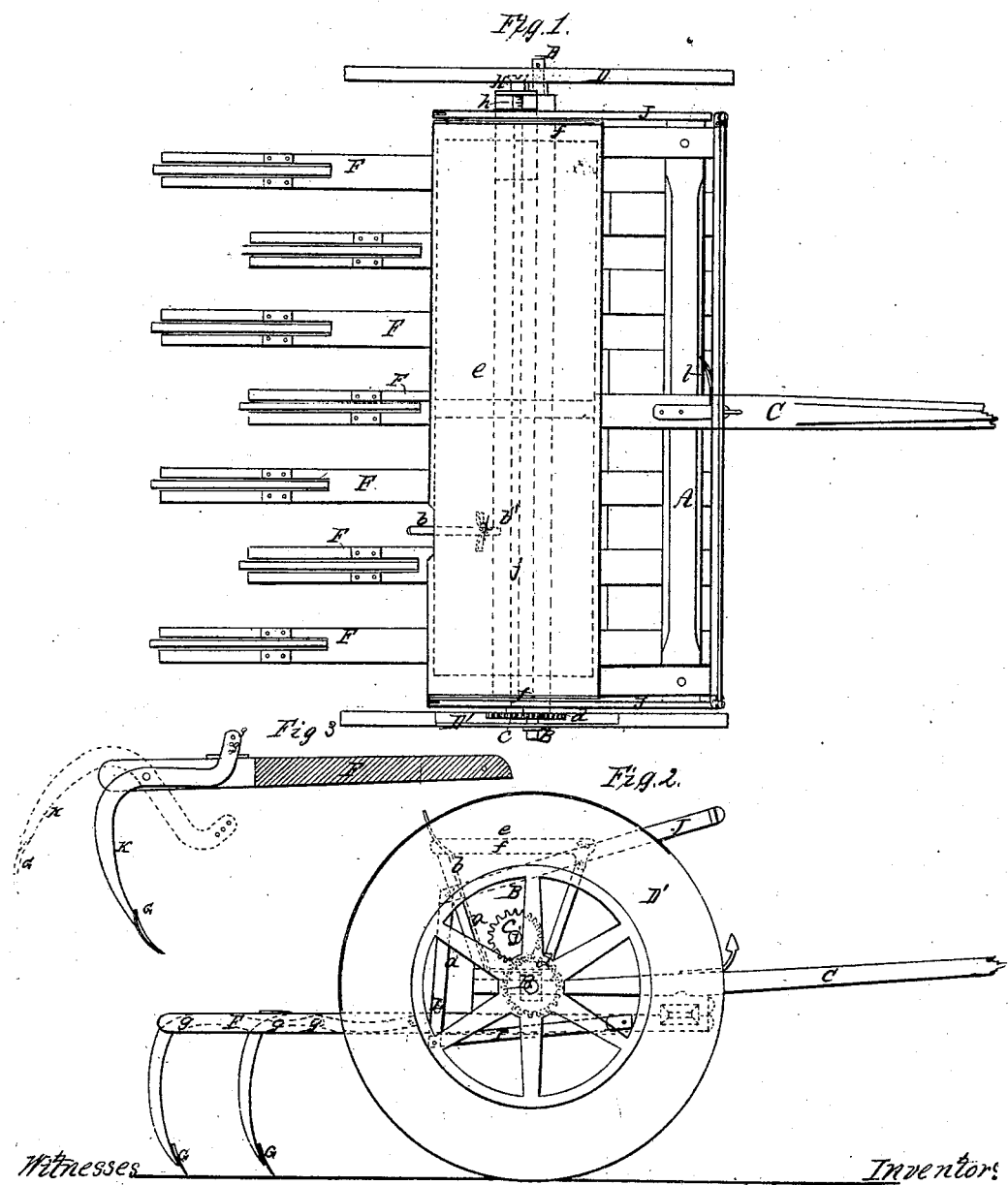

United States Patent Office.

A. R. BLOOD, A. HATHAWAY, AND V. R. BEACH, OF INDEPENDENCE, IOWA.

*Letters Patent No. 79,304, dated June 30, 1868.*

IMPROVEMENT IN CULTIVATOR.

*The Schedule referred to in these Letters Patent and making part of the same.*

TO ALL WHOM IT MAY CONCERN:

Be it known that we, A. R. BLOOD, A. HATHAWAY, and V. R. BEACH, of Independence, in the county of Buchanan, and State of Iowa, have invented certain new and useful Improvements in Cultivators; and we do hereby declare that the following is a full, clear, and exact description thereof, reference being had to the accompanying drawings, and to the letters of reference marked thereon, which form a part of this specification, in which—

Figure 1 represents a plan or top view of our machine, and

Figure 2 a side elevation of the same.

The nature of this invention consists, first, in constructing the arms or shanks of the cultivator-teeth with adjusting-holes; second, in the employment of levers, connected by a cross-bar, for elevating the teeth; third, supplying the seed-slide with a set-screw, for gauging the amount of seed to be sown; fourth, providing the cultivator with a pivoted frame directly beneath the cultivator-bars, to which frame the levers are attached; and, finally, in the employment of a rod or bar, acting as a lever, for depressing the teeth in the ground, and attached to the pivoted frame, substantially in the manner hereinafter set forth.

To enable others skilled in the art to make and employ our invention, we will now describe its construction and operation.

In the accompanying drawings, A represents the frame of the machine, upon which is secured the axle B. Secured to the axle, and resting upon the front end of the frame, is the tongue C. D D' represent the wheels, which are placed on the axle B. The wheel D' is provided, on its inner side, with a pinion, $d$, which is soldered or otherwise secured thereto, and will be referred to further hereafter. E designates the seed-box, which is situated upon and secured to the axle B, and furnished, in its bottom, with diamond-shaped holes, for the exit of the seed. $b$ represents a lever, having its fulcrum at $x$, and secured, at its lower end, to the diamond-shaped perforated seed-slide $b'$, shown in dotted lines in the drawings of fig. 1. $e$ is the lid or cover of the seed-box, which is hinged or secured thereto by means of metal strips, $ff$, represented in dotted lines in fig. 2. Secured and working in the lower part of the seed-box E is the rod $j$, to the outer end of which is fastened a pinion, $c$, which gears into the pinion $d$, formed on the inside of wheel D'. F F represent the cultivator-bars, which are secured in place, at their front ends, to the under side of the front part of frame A by means of a metal rod, which passes through them, and is secured in the sides of said frame. Every other one of the bars F F is made to project out a suitable distance beyond the other, and provided with slots, in order to receive the shanks of the cultivator-teeth G G. The upper ends of the shanks of the cultivator-teeth G G are supplied with holes $g$, as shown in fig. 2, for the purpose of adjusting the teeth to any desired depth in the ground. I designates a frame, pivoted, at its inner ends, to the lower side of frame A, and provided, at its outer ends, with a bar, which rests against the under side of the cultivator-bars F F. Resting on the bars F F, and attached to the bar of the pivoted frame I, is a bar or rod, L, which acts as a lever in depressing or sinking the teeth in the ground, when operated as will be stated hereafter. J J designate two levers, one of which is pivoted to each side of the seed-box, near its lower end, and fastened together, at their front ends, by means of a brace, which is held in place by metal braces or loops passing around the ends of the levers. The lower or rear ends of the levers are slotted, so as to receive one end of the strips $a\,a$, the opposite end of said levers being secured to the bar of the pivoted frame I. H designates a set-screw, which screws in a small metal plate, $h$, fastened to the bottom of the seed-box, and bent at right angles with it, so as to make it parallel with the seed-box, and thus allow the screw H to be screwed against or from the seed-slide, as the case may require. The object of this arrangement is to gauge the quantity of seed to be sown by forcing or operating the screw against the slide, thus making smaller or lessening the size of the holes in the slide. $l$ is a catch, by means of which the levers J J are held down in place when the machine is not in motion, said catch engaging with another catch on the tongue of the machine.

The operation of our machine is as follows: The driver, being in position, will start the horses, drawing the machine over the ground to be furrowed, in order to receive the grain at the same instant, and pressing the levers J J upwards, lowering the teeth, and causing the bar L to depress or sink the teeth into the earth. At the same time, pinion $d$, on wheel D′, will be operated, communicating motion to pinion $c$, and causing rod $j$ to be revolved, which will loosen the seed in the seed-box, and allow them to escape through the holes in the bottom of the box, the seed-slide being gauged, according to the size of holes required, by means of the set-screw H, thus furnishing a simple and perfect means for cultivating the ground.

What we claim as new, and desire to secure by Letters Patent, is—

1. The levers J J, strips $a\,a$, bar L, and pivoted frame I, when all are arranged and operating substantially in the manner and for the purpose set forth.

2. The set-screw H, seed-slide $b'$, levers J J, strips $a\,a$, bar L H, pivoted frame I, all combined and arranged as and for the purpose described.

In testimony that we claim the foregoing as our own, we affix our signatures in presence of two witnesses.

A. R. BLOOD,
          A. HATHAWAY,
          V. R. BEACH.

Witnesses:
  D. B. CUTTER,
  RICHARD CAFFALL.